(12) United States Patent
Geraud et al.

(10) Patent No.: US 11,227,054 B2
(45) Date of Patent: Jan. 18, 2022

(54) METHOD FOR MODULATING ACCESS TO A RESOURCE, CORRESPONDING PROGRAM AND DEVICE

(71) Applicant: Banks and Acquirers International Holding, Paris (FR)

(72) Inventors: Remi Geraud, Paris (FR); David Naccache, Paris (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 70 days.

(21) Appl. No.: 15/437,697

(22) Filed: Feb. 21, 2017

(65) Prior Publication Data

US 2017/0255787 A1 Sep. 7, 2017

(30) Foreign Application Priority Data

Mar. 1, 2016 (FR) ...................................... 1651714

(51) Int. Cl.
*G06F 21/60* (2013.01)
*G06F 21/55* (2013.01)
(Continued)

(52) U.S. Cl.
CPC ............ *G06F 21/604* (2013.01); *G06F 21/53* (2013.01); *G06F 21/556* (2013.01);
(Continued)

(58) Field of Classification Search
CPC .... G06F 21/53; G06F 21/604; G06F 21/6281; G06F 2221/2141; G06F 12/14; G06F 12/1408; G06F 12/1458; G06F 12/1483
See application file for complete search history.

(56) References Cited

U.S. PATENT DOCUMENTS 6,263,445 B1 * 7/2001 Blumenau ........... G06F 21/6218
726/2
6,631,394 B1 * 10/2003 Ronkka ................. G06F 9/4812
718/100
(Continued)

OTHER PUBLICATIONS

Preliminary Search Report with regard to FR 1651714 dated Oct. 24, 2016.
(Continued)

*Primary Examiner* — Alexander Lagor
*Assistant Examiner* — D'Arcy Winston Straub
(74) *Attorney, Agent, or Firm* — David D. Brush; Westman, Champlin & Koehler, P.A.

(57) ABSTRACT

A method for controlling access to preliminarily identified computer resources is disclosed. The access is controlled so as to prevent the circumventing, by malicious applications, of barriers set up to prevent them from communicating when they are executed on one or more processors of an electronic device The method is implemented by an electronic device having access to the resources to be controlled. The method includes: receiving a request, coming from a program, for access to a current resource; obtaining at least one access parameter for access to the current resource within a resource-characterizing data structure; and modulating access to the current resource as a function of the at least one access parameter.

8 Claims, 3 Drawing Sheets

(51) Int. Cl.
*G06F 21/62* (2013.01)
*G06F 21/53* (2013.01)
*H04L 29/06* (2006.01)

(52) U.S. Cl.
CPC ........ *G06F 21/602* (2013.01); *G06F 21/6281* (2013.01); *H04L 63/0414* (2013.01); *H04L 63/0428* (2013.01); *H04L 63/10* (2013.01); *H04L 63/1408* (2013.01); *H04L 63/1441* (2013.01)

(56) References Cited

U.S. PATENT DOCUMENTS

| | | | | |
|---|---|---|---|---|
| 2004/0010701 A1* | 1/2004 | Umebayashi | ....... | G06F 21/6227 713/193 |
| 2004/0243845 A1* | 12/2004 | Larsen | .................... | G06F 21/44 726/4 |
| 2005/0076237 A1* | 4/2005 | Cohen | .................... | G06F 9/468 726/4 |
| 2007/0058800 A1* | 3/2007 | Neisse | .................... | H04L 9/003 380/28 |
| 2007/0221724 A1* | 9/2007 | Kanai | ................. | G06F 11/1016 235/382 |
| 2012/0159103 A1 | 6/2012 | Peinado et al. | | |
| 2014/0123139 A1 | 5/2014 | Fine et al. | | |
| 2015/0248357 A1* | 9/2015 | Kaplan | ............... | G06F 9/45558 713/193 |
| 2015/0373035 A1* | 12/2015 | Patne | ................. | H04L 63/1416 726/23 |

OTHER PUBLICATIONS

Chen et al., "Overshadow: A Virtualization-Based Approach to Retrofitting Protection in Commodity Operating Systems", ASPLOS'08, 2008, pp. 2-13.

English translation of Written Opinion of the French Searching Authority dated Oct. 24, 2016 for corresponding French Application No. 1651714, filed Mar. 1, 2016.

* cited by examiner

METHOD FOR MODULATING ACCESS TO A RESOURCE, CORRESPONDING PROGRAM AND DEVICE

1. CROSS-REFERENCE

The present application claims priority to French Patent Application No. 1651714, filed on Mar. 1, 2016, the entirety of which is incorporated herein by reference.

2. FIELD OF THE INVENTION

The invention relates to the control of access. The invention relates more particularly to the control of access to computing resources. More specifically, the invention relates to the control of access to computing resources, by applications that are executed on an electronic device.

The present invention proposes a solution to the problem of the ways in which malicious applications circumvent the barriers set up to prevent them from communicating when they are executed on one or more processors of an electronic device.

3. PRIOR ART

Most modern operating systems have mechanisms at their disposal to prevent direct communication between independent processors. These operating systems offer strict control functions for controlling inter-process communications. Technologies such as the isolation of processes (for example, virtual addressing or sandboxing) can be implemented in software or hardware. It is specified that here below and here above, the terms "application", "program" and "process" are considered to be equivalent although there can be varying degrees of difference between them.

It is essential, for applications handling sensitive data or performing secured processing operations, that another application should not be able to steal this sensitive data and more generally that it should not be possible to exfiltrate sensitive data. Certain types of devices, such as payment terminals, set up logic barriers to prohibit such communication. Such barriers are known as "firewalls" and permit only certain well-defined applications to share information through an IPC (inter-process communication) mechanism governed by the security policy of the device.

However, there are techniques that make it possible to counter these protection measures. These techniques make use for example of the processes table managed by the operating system.

The processes table is a data structure managed in the random-access memory of the device (terminal, computer, smartphone, tablet). This table comprises information on the processes currently being processed by the operating system and especially the identifier of these processes. This information is generally considered to be inoffensive and is visible to all the processes and all the users. A few exceptions in specific systems exist. However, in the great majority of cases, this information is visible and exploitable.

Thus, logic protection systems in position are inoperable in the face of novel side-channel attacks targeting such information. In addition to the identifier table, other information can also be exploited for example the computation load of the processor, the use of shared resources, information on ongoing processes, etc.

Thus, for example, when a program is executed, it receives an identifier number that is registered in the processes table. This table can be consulted by all the applications. In deciding on whether or not to launch this program, an application can transmit a 0 or a 1.

In addition, in the case of a real-time operating system (RTOS), the use of physical information (processor load, available memory, etc.) and the simultaneous application of several applications make the communication of this information easy.

Now, it is becoming increasingly frequent for, types of devices that were formerly dedicated solely to the implementation of secured functions (such as payment terminals) to also propose the implementation of non-secured functions. Such possibilities of implementation are required by the customers of these devices: they wish to be able to execute both secured applications and non-secured applications (of the advertisement type, for example for payment terminals).

It is however difficult to control all installed applications (multimedia applications for example can be created by third parties that are not controlled by the manufacturer of the device). The result of this is that one or more malicious applications can potentially be installed on devices that implement secured functions. These malicious applications normally cannot communicate with secured programs or processes (because of the setting up of inter-process communications control mechanisms) but they can obtain secondary information enabling other confidential information to be deduced.

It is therefore necessary to propose a solution that makes it more difficult to obtain and understand secondary but nevertheless important information in the context of malicious use of this information by different processes.

4. SUMMARY

The proposed technique is used to prevent at least some of the drawbacks of the prior art. The proposed technique thus makes it possible to obfuscate procedural behavior and mislead malicious applications.

More particularly, a method is described for controlling access to preliminarily identified resources, the method implemented by an electronic device comprising means of access to said resources to be controlled. Such a method comprises:
- a step for receiving a request, coming from a program, for access to a current resource;
- a step for obtaining at least one access parameter for access to said current resource within a resource-characterizing data structure;
- a step for modulating access to said current resource as a function of said at least one preliminarily obtained access parameter.

Thus, unlike with prior art techniques, it is possible to change access to a given resource as a function of parameters that are attached to it in the operating system or in a table of resources of the operating system. It is thus possible to not give direct access from the operating system to the resources but, so to speak, blur the access to the resource as a function of specific access parameters.

According to one particular characteristic, the step for obtaining at least one parameter comprises:
- a step for identifying the current resource in the resource-characterizing data structure as a function of a resource identifier;
- a step for obtaining, within said data structure, a semanticity indicator and at least one modulation parameter.

The semanticity indicator is a representation of the semantic or non-semantic character of a resource.

According to one particular embodiment, depending on the semanticity indicator, the modulation step comprises:
- an implementing of a step for masking non-semantic data; or
- an implementing of a step for masking semantic data;
- implementing either one of these two masking steps as a function of the modulation parameters.

Thus, the modulation is by nature parametric. Access to the resources can thus be modulated according to their semantic characteristics. This substantially simplifies and increases the efficiency of the masking (or blurring). At the same time, this also prevents an attacker from spotting a masking scheme. Indeed, since all the modulations of access to the resources are parametrized, it is possible to differentiate between the processing operations prior to access to each of these resources.

According to one particular embodiment, the step for masking non-semantic data comprises:
- a step for obtaining a code cA corresponding to the program;
- a step for computing an encrypted value $C_{RX}=E(RC, cA)$ of the current resource by cA;
- a step for transmitting the encrypted value $C_{RX}$ to said program.

Thus, in a very unusual way, instead of transmitting a resource to the calling program, an encrypted value of the resource is transmitted, about which in principle the program can do nothing. It is only when the program requests effective access to this resource that it becomes decrypted by the operating system. Thus, a malicious program intercepting the transmitted encrypted resource cannot have real access to this resource in place of the calling program.

According to one particular embodiment, the step for masking non-semantic data comprises:
- a step for receiving an encrypted value $C_{RX}$ of the current resource RC conning from the program;
- a step for obtaining a code cA corresponding to the program;
- a step of decryption $RC=E^1(C_{RX}, cA)$ delivering the value of the current resource RC;
- a step for implementing an operation required by the program on the current resource.

Thus, the calling program does not have direct access to the resource. To be able to obtain a value associated with this resource, the calling program is obliged to go through a decryption step, this step being conducted by the operating system upon the request of the program as a function of the previously transmitted encrypted value.

Another aspect of the invention relates to a module for controlling access to preliminarily identified resources. Such a module is generally implemented within an electronic device that comprises means of access to the resources to be controlled.

A module of this type comprises:
- means for receiving a request, coming from a program, for access to a current resource;
- means for obtaining at least one parameter of access to said current resource within a resource-characterizing data structure;
- means for modulating access to said current resource as a function of said at least one preliminarily obtained access parameter.

Such means for example take the form of printed circuits, for example FCPGA or micro-FCPGA type printed circuits, connected to one another by appropriate circuits, and comprising a means of protection against intrusion. These mechanisms make it possible to ensure that the module cannot be subjected (or can only be subjected with very great difficulty) to a physical attack against it.

According to another aspect, the invention also relates to an electronic device of the type comprising a processor, a random-access memory and a storage memory, the device also comprising an operating system, executed within the random-access memory and enabling access to resources of said electronic device. Such a device comprises at least one module for controlling access to said resources as described above.

In a preferred embodiment, the different steps of the methods according to the invention are implemented by one or several software or computer programs, comprising software instructions intended for being executed by a data processor of a device according to the invention, and being adapted to implement the different steps of the methods.

Thus the invention is also aimed at providing a computer program, this program being capable of being implemented in a computer or in a data processor, this program comprising instructions adapted to implement the steps of a method as defined here above.

This program can use any programming language whatsoever, and can be in the form of source code, object code or intermediate code between source code and object code, such as in a partially compiled form or in any other desirable form whatsoever.

The invention also seeks to provide an information carrier readable by a data processor and comprising instructions of a program as mentioned here above.

The information carrier can for example be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the invention can especially be uploaded to an Internet type network.

As an alternative, the information support can be an integrated circuit into which the program is incorporated, the circuit being adapted to executing or being used in the execution of at least any one of the methods in question.

According to one embodiment, the invention is implemented by means of software and/or hardware components. In this respect, the term "module" can correspond in this document equally well to a software component and to a hardware component as to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router, etc) and is capable of accessing hardware resources of this physical entity (memories, recording carriers, communications buses, input/output electronic boards, user interfaces, etc.

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smart card, a memory card, an electronic board for the execution of firmware, etc.

Each component of the above-described system of course implements its own software modules.

The different embodiments described here above can be combined with one another to implement the invention.

5. DRAWINGS

Other features and advantages of the proposed technique shall appear more clearly from the following description of a preferred embodiment, given by way of a simple illustratory and non-exhaustive example and from the appended drawings, of which:

Figure 3:
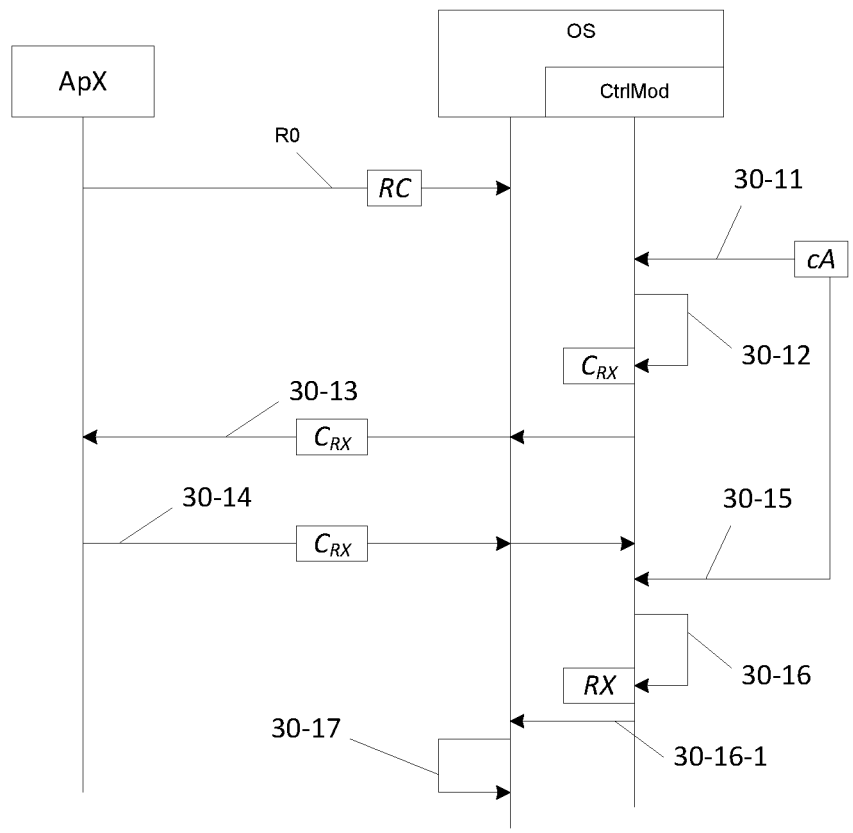

FIG. 3 describes the modulation of access to a non-semantic resource; and

Figure 4:
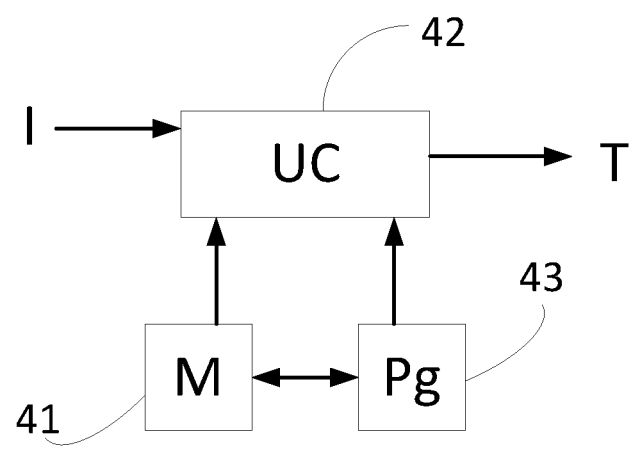

FIG. 4 briefly describes an implementing device.

6. DESCRIPTION 6.1. Reminder of the General Principle

Figure 1:
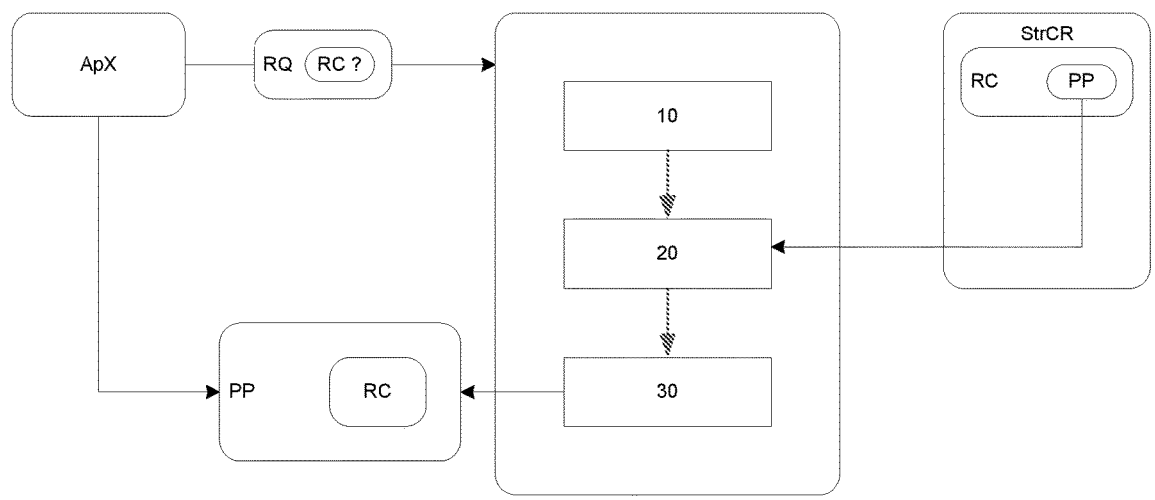
FIG. 1 is a block diagram of the proposed technique.

As explained further above, the invention seeks to prevent an application, or a program executed on an electronic device, from transmitting or receiving information from the operating system and/or from other applications or program. The general principle of the technique is presented with reference to FIG. 1. Thus, the invention implements a particular technique that is the object of the present invention. This technique takes the form of a method for controlling access to pre-identified resources, the method comprising a step (10) for receiving a request (RQ), from a program (ApX), for access to a current resource (RC); a step (20) for obtaining at least one parameter (PX) of access to said current resource (RC) within a resource-characterizing data structure (StrCR), a step (30) for modulating access to said current resource (RC) as a function of said at least one preliminarily obtained access parameter (PX). Thus, unlike in the prior art techniques in which barriers to inter-process (or inter-program or inter-application) communications are raised, the method of the invention comprises the implementing of a modulation of access to the resources, in principle the shared resources, of the operating system in order to prevent or make it difficult for a malicious program or application to correlate public information.

The data structure on which the present invention is based can take the form of a table comprising an identifier of the resource, a semanticity indicator and one or more access modulation parameters. The semanticity indicator is a representation of the semantic or non-semantic character of a resource. As will be explained further below with reference to the different embodiments and variants, the parameters for modulating access to the resource can take the form of encryption keys, in the form of incrementing or decrementing values or again in the form of random numbers. The type of parameter associated with a resource identifier is predefined: the designer of a system that is an object of the present invention decides, when implementing the system, on the type of parameter associated with a given resource identifier. For example, for an access to a process identifier, the type of parameter is, for example, an encryption and the parameter as such (i.e. its value) is either an encryption key predetermined by the designer or a pointer toward an encryption key generator (which generates a key on the fly, and can then store it for future use intended for this resource identifier). In other words, the general principle of the system and of the proposed method consists of the implementation of a specific mechanism of interruption, a mechanism implemented by the operating system which, in a predetermined way, modulates access to these resources which can be apprehended by the operating system as a function of the modulation parameter and a type of resource.

In a complementary way, the modulation of access to the resource is accompanied by an access-blocking mechanism. More particularly, the access by a program or a process to a given resource is accompanied by a blocking of access to this resource for the other programs (or processes). This blocking can take several forms. In one particular configuration, the blocking is a two-way blocking: no other process is allowed to write or read a value relative to the resource when it is used by a current process. In another particular configuration, the blocking is a one-way blocking: only one operation of the same nature as the one implemented by the current process is authorized; for example, in the event of an attempt to access the same resource, the access control module does not allow access enabling the current process to read the resource and a second process to write to this same resource at the same time. A detailed implementation of this blocking is presented below.

6.2. Modulation of Access to the Resources

The present invention has a module for controlling access that modulates access to the resources. This module is managed by the operating system. Depending on the configurations, this control module is either independent of the operating system or directly integrated into it. The operating system makes use of this module when it receives a request for access to a resource (for example from a process). The request for access to a resource can take the form of an interruption, as is the case in certain operating systems of a Linux type. Other requesting mechanisms can also be implemented.

The module for its part has access to a table of resources in which at least certain resources are identified. This table of resources comprises for example the identifiers of resources that the manufacturer of the device considers to be potential carriers of information enabling concealed-channel attacks to be carried out. Among the resources that can be envisaged, we can cite especially the load of the processor, the process identifiers (PID), the available memory, the date, the time and clock data as a rule as well as sound input, sound output, output peripherals (screen, printer) input peripheral (keyboard, keypad), measured signal power (WiFi, Bluetooth, NFC wireless signal), etc.

Within the table of resources, each entered resource has a corresponding resource identifier, an indication of the semantic or non-semantic character of the resource and one or more parameters to modulate access to this resource.

Figure 2:
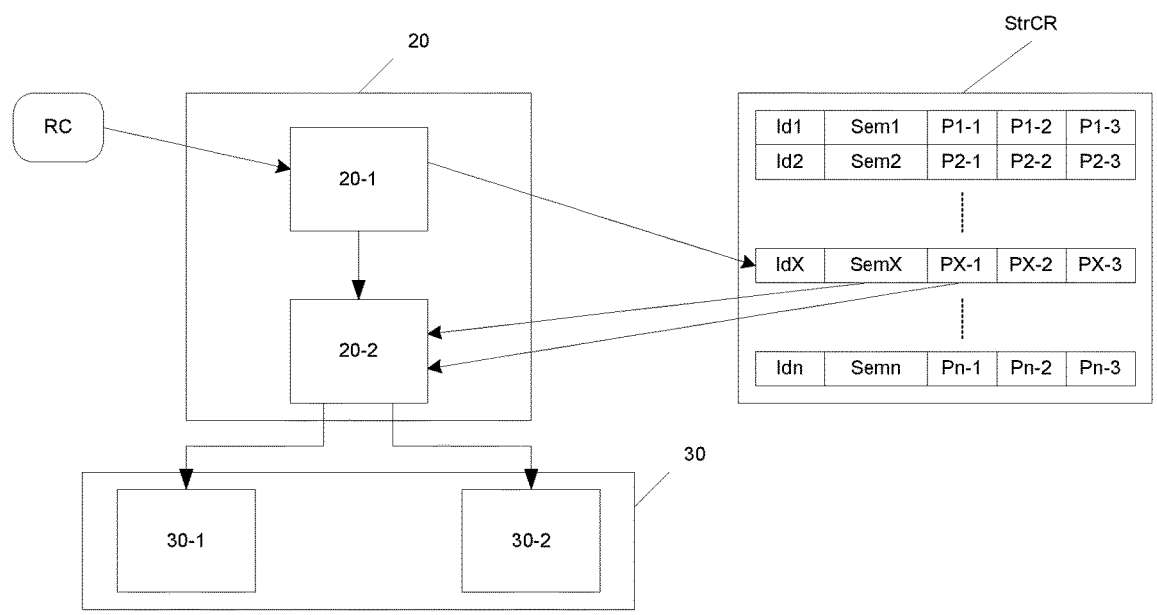
FIG. 2 is a block diagram representing the modulation of access to the resources.

The principle implemented in access control is presented with reference to FIG. 2. The step for obtaining a parameter comprises a step (20-1) for identifying the current resource (RC) in the resource-characterizing data structure (StrCR) as a function of the resource identifier (IdX); and a step (20-2) for obtaining a semanticity indicator (SemX) and at least one modulation parameter (PX-1, PX-2, PX-3). Depending on the semanticity indicator (SemX), the modulation step (30) comprises either the implementing of a step (30-1) for masking non-semantic data; or the implementing of a step (30-2) for masking semantic data. Either of these two masking steps is implemented according to modulation parameters (PX-1, PX-2, PX-3).

Thus, when a resource is typed as being a semantic resource, the modulation consists in sending the process a flawed or error-containing piece of information (i.e. a piece of information that is incorrect or partially incorrect). Thus, any resource shared by at least two applications, possessing a semantic value (for example available memory), is flawed or contains error. The error is small enough for the operation of the application to be undisturbed but big enough to jam any side channel.

When a resource is not distinctly characterized as being a semantic resource, the modulation, in one embodiment, consists of the transmission of a piece of encrypted data. In other words, any resource shared by at least two applications that does not possess any semantic value (for example an identifier) is masked as follows: a code, unique to each known application of the operating system (or control module), serves to encrypt the resource. The operating system (or control module) transmits the encrypted resource to the application. When the application wishes to use the resource, it communicates this piece of encrypted data, which the operating system (or control module) decrypts (and if necessary encrypts again, differently, in order to transmit it to a third-party application). In other embodiments, other masking processes can be used: for example rather than encrypt the non-semantic data, it is possible to provide access to this data by a process of transfer or displacement in which access is provided by a pointer, said pointer representing an address that is modified at each access to the resource. Thus, for example, rather than transmitting a value of a resource, a pointer is transmitted, pointing towards the resource. The ingenious solution here is to copy out the resource, prior to this transmission, into a different memory zone each time. Thus, the method of the invention transmits a pointer that points towards a different memory zone each time so that a current application will receive a pointer pointing towards a memory zone different from the one pointed to by the pointer transmitted to another application. Once it is used by the application, the memory zone containing the resource is erased (for example replaced by zero instructions).

6.2.1. Masking of a Non-Semantic Data by Encryption

In order to mask data that has no semantic value, the operating system uses a symmetrical encryption procedure. This procedure can be an XOR encryption. Each application has a unique code determined by the operating system and kept secret. This code can be determined when the application is launched or when the apparatus is booted, or at the first use of a shared resource. This code can be chosen for example as a random number of a sufficient size. The principle of masking non-semantic data (30-1) is described with reference to FIG. 3.

When an application AAp makes a request (RO) for the shared resource RX, the following method is implemented:
  the control module retrieves (30-11) (for example from the resource table, see above) the code cA corresponding to the program ApX;
  the control module computes (30-12) the encrypted value $C_{RX}=E(X, cA)$ of the current resource (RC) by cA;
  the control module (or operating system) transmits (30-13) $C_{RX}$ to the program ApX;

Thus, it is not the current resource (RC) in itself that is transmitted to the calling application (AAp), but an encrypted value of the resource. For example, when the resource corresponds to a memory address, the application requests the operating system for a location in memory. The operating system (using the control module) transmits not the address but an encryption of this address.

When the program ApX wishes (immediately or thereafter) to use the shared resource, the following message is implemented:
  program ApX transmits (30-14) the encrypted value $C_{RX}$ to the operating system (which transmits it to the control module);
  the control module (30-15) retrieves the code cA corresponding to the program ApX, for example in the table of resources;
  the control module (30-16) decrypts $RX=E^1(C_{RX}, cA)$ and retrieves the value of RX;
  optionally, the control module transmits (30-16-1) the value RX to the operating system (when the control module is independent of the operating system);
  the operating system performs (30-17) the operation requested by the program ApX on the current resource (RC).

Thus, for example, when the application wishes to write to the memory address RX, it transmits the address $C_{RX}$ to the operating system (with the value to be written to this address). The operating system or the control module (depending on the configuration) decrypts $C_{RX}$ and writes to memory.

When a second application (for example BAp) wishes to access the current resource (RC), the same steps as those described above are implemented with one difference: the control module takes charge of the encryption (and decryption) of the resource with a code cB corresponding to the application BAp.

This masking is transparent for the applications. This masking also substantially disturbs the observation work being done by an attacker because even if this attacker controls the application (for example AAp), he cannot really know the values of the non-semantic resources.

Shared resources that do not have semantic values are for example: series numbers, identifiers, memory addresses, process number, etc.

6.2.2. Masking of the Semantic Data

For data having a semantic value, the masking consists in transmitting a flawed or error-containing value to the applications. This error is determined by the variability of the data: a piece of data liable to vary rapidly (e.g. a fast clock) will undergo greater correction than a data liable to vary slowly (for example the day of the year).

This masking impacts on the applications and cannot necessarily be applied to all the data but it has little effect when the data relates to physical measurements (e.g. the power of the NFC signal). It must be noted that all the applications receive a slightly different piece of information. Thus, for example, for an application that requires information on the quantity of random-access memory available within the terminal, the method described above is implemented. It comprises the identification of the requested resource and the obtaining of a parameter of modulation of this resource. The typical modulation parameter for this resource depends on a random and non-predictable number. Thus, before providing a value relative to this resource, we obtain a random number (possibly bounded); this random number is then added to or subtracted from the real quantity of memory available; to finish the operation, the result of the above computation is transmitted to the calling program. Another calling program thus cannot obtain the same value as the one transmitted previously. This example can also apply to the load of the main processor of the device or to the load of a secondary processor (for example an encryption processor and/or a video data processor).

Other shared resources having a semantic value are for example: available mass memory, time, electrical consumption, battery level, etc.

Thus, with this modulation of the semantic values, an attacking program (a malicious program) cannot simply follow the progress and/or modifications that occur in the behavior of the device. Thus it is difficult to track the behavior of a specific program executed on the device and it is therefore difficult to carry out a concealed-channel attack.

6.3. Mutual Blocking of the Processes

In this section, we present the mechanism for blocking access to resources.

As presented above, there are two types of blocking: either two-way blocking or one-way blocking.

In two-way blocking, the resource is completely blocked so long as it is used by a current process. This means that no other process is allowed to obtain access to the resource so long as it is used by the current process. To make up for this absence of access to the resource, the control module, confronted at reception with a request for access to the resource by another resource, implements a waiting loop during which the other process is made to wait for access to the resource. When access to the resource is released by the current process, the control module permits access to the other process.

In one-way blocking, a different mutual exclusion is carried out depending on the operation performed by the current process. Thus, in one particular embodiment, the mutual exclusion mechanism is governed by the following rule: for any channel, an application blocks access in read mode (and in write mode respectively) so long as it maintains access in write mode (and in read mode respectively).

This notion has to be understood in a broader sense: for example if an application that asks to read the load of the processor has access thereto, then in so doing, it blocks the execution of other applications or processes (that would be likely to modify its value). Through this example, we understand that a process other than a current process does not have direct access to the "processor load". By contrast, the simple fact of launching a new process can modify the processor load and thus give an indication about the increase in the load of the processor to the current processor which is trying to have access to it.

Thus this blocking consists in obliging any application that requests access to a read communications mode to block the other applications that wish to write by this mode and, in a reciprocal manner, it consists in requiring that any write operation should block an attempt to read in the same mode.

In general, any resource can be blocked: for example if an application uses a microphone, access to the sound-producing peripherals is blocked for all the other applications (in certain context, the embedded printer of the terminal can produce sound).

Exceptions can be allowed when peripherals for capturing or sending have very different domains (for example screen and NFC sensor which both use separate segments of the electromagnetic spectrum).

This mutual exclusion is ensured by the access-control module of the operating system. As an alternative, rather than strict blocking, the access-control module of the operating system can defer the execution of the applications at risk.

6.4. Other Characteristics and Advantages

Referring to FIG. 4, we described an electronic device implemented to control the use of resources according to the method described above.

For example, the electronic device comprises a memory 41 constituted by a buffer memory, a processing unit 42 equipped for example with a microprocessor and driven by the computer program 43 implementing a control method. At initialization, the code instructions of the computer program 43 are for example loaded in/to a memory and then executed by the processor of the processing unit 42. The processing unit 42 inputs at least one piece of data representing a resource that an application wishes to access. The microprocessor of the processing unit 42 implements the steps of the method according to the instructions of the computer program 43 to modulate access to the resource, if need by adjoining a blocking of said resource for other applications. As explained, the modulation of the access makes use of a data structure comprising, for the resources, modulation parameters.

To this end, the electronic device comprises, in addition to the buffer memory 41, communications means such as network communications modules, data transmissions means and as the case may be a dedicated encryption processor.

All these means can take the form of a particular modular processor implemented within the device, said processor being a secured processor. According to one particular embodiment, this electronic device implements a particular application which is responsible for carrying out the encryption and the transmission of data, this application being for example given by the manufacturer of the processor in question in order to enable the use of said processor. To this end, the processor comprises unique identification means. These unique identification means ensure the authenticity of the processor.

The invention claimed is:

1. A method for controlling access to preliminarily identified computing resources, the method being implemented by an electronic device configured to modulate access to said computing resources to be controlled, the method comprising:

receiving a request, coming from a program installed on the electronic device, for access to a current resource of the preliminarily identified computing resources;

obtaining at least one modulation parameter for access to said current resource within a resource-characterizing data structure, wherein the resource-characterizing data structure associates for each of the preliminarily identified computing resources a respective resource identifier, an indicator and at least one modulation parameter, the indicator indicating whether the associated resource is a resource of a first type of the preliminarily identified computing resources having values that are variable over time or is a resource of a second type of the preliminarily identified computing resources that is distinct from the first type, and wherein the computing resources of the first type are selected from the group consisting of:
available random-access memory,
available mass storage memory,
power of a received signal,
time,
date,
clock,
electrical consumption,
battery level, and
processor charge level;

the computing resources of the second type are selected from the group consisting of:
an identifier, a memory address,
a process number, and
a serial number; and
the obtaining comprises:
identifying the current resource in the resource-characterizing data structure as a function of the resource identifier of the current resource; and
obtaining, from said resource-characterizing data structure, the indicator and the at least one modulation parameter associated with the resource identifier of the current resource; and
modulating access to said current resource by the program as a function of the obtained indicator and the obtained at least one modulation parameter associated with said current resource, wherein the modulating comprises:
if the indicator indicates the associated resource is of the first type, sending the program an error-containing piece of information;
else if the indicator indicates the associated resource is of the second type, sending the program a piece of encrypted data or a pointer pointing toward the associated resource.

2. The method for controlling access according to claim 1, wherein, the modulating access to said current resource comprises:
masking data as a function of the at least one modulation parameter.

3. The method for controlling access according to claim 2, wherein for the preliminarily identified computing resources of the second type the masking data comprises:
obtaining a code corresponding to the program;
computing an encrypted value of the current resource by using the code; and
transmitting the encrypted value to said program.

4. The method for controlling access according to claim 2, wherein for the preliminarily identified computing resources of the second type the masking data comprises:
receiving an encrypted value of the current resource coming from the program;
obtaining a code corresponding to the program;
decrypting the encrypted value by using the code, delivering the value of the current resource; and
implementing an operation required by the program on the current resource.

5. A module for controlling access to preliminarily identified computing resources, wherein the module is implemented within an electronic device configured to modulate access to said computing resources to be controlled, and wherein the module comprises:
means for receiving a request, coming from a program installed on the electronic device, for access to a current resource of the preliminarily identified computing resources;
means for obtaining at least one modulation parameter for access to said current resource within a resource-characterizing data structure,
wherein the resource-characterizing data structure associates for each of the preliminarily identified computing resources a respective resource identifier, an indicator and at least one modulation parameter, the indicator indicating whether the associated resource is a resource of a first type of the preliminarily identified computing resources having values that are variable over time or is a resource of a second type of the preliminarily identified computing resources that is distinct from the first type, and wherein the computing resources of the first type are selected from the group consisting of:
available random-access memory,
available mass storage memory,
power of a received signal,
time,
date,
clock,
electrical consumption,
battery level, and
processor charge level;
the computing resources of the second type are selected from the group consisting of:
an identifier,
a memory address,
a process number, and
a serial number; and
the obtaining comprises:
identifying the current resource in the resource-characterizing data structure as a function of the resource identifier of the current resource; and
obtaining, from said resource-characterizing data structure, the indicator and the at least one modulation parameter associated with the resource identifier of the current resource; and
means for modulating access to said current resource by the program as a function of the obtained indicator and the obtained at least one modulation parameter associated with said current resource, wherein the modulating comprises:
if the indicator indicates the associated resource is of the first type, sending the program an error-containing piece of information;
else if the indicator indicates the associated resource is of the second type, sending the program a piece of encrypted data or a pointer pointing toward the associated resource.

6. An electronic device comprising:
a processor;
a random-access memory and a storage memory;
an operating system, executed within the random-access memory and enabling access to preliminarily identified computing resources of said electronic device; and
a module for controlling access to said computing resources, the module for controlling access to said computing resources comprising:
means for receiving a request, coming from a program installed on the electronic device, for access to a current resource of the preliminarily identified computing resources;
means for obtaining at least one modulation parameter for access to said current resource within a resource-characterizing data structure,
wherein the resource-characterizing data structure associates for each of the preliminarily identified computing resources a respective resource identifier, an indicator and at least one modulation parameter, the indicator indicating whether the associated resource is a resource of a first type of the preliminarily identified computing resources having values that are variable over time or is a resource of a second type of the preliminarily identified computing resources that is distinct from the first type, and wherein:
the computing resources of the first type are selected from the group consisting of:
available random-access memory, available mass storage memory,
power of a received signal,
time,
date,
clock,
electrical consumption,
battery level, and
processor charge level;
the computing resources of the second type are selected from the group consisting of:
an identifier,
a memory address,
a process number, and
a serial number; and
the obtaining comprises:
identifying the current resource in the resource-characterizing data structure as a function of the resource identifier of the current resource; and
obtaining, from said resource-characterizing data structure, the indicator and the at least one modulation parameter associated with the resource identifier of the current resource; and
means for modulating access to said current resource by the program as a function of the obtained indicator and the obtained at least one modulation parameter associated with said current resource, wherein the modulating comprises:
if the indicator indicates the associated resource is of the first type, sending the program an error-containing piece of information;
else if the indicator indicates the associated resource is of the second type, sending the program a piece of encrypted data or a pointer pointing toward the associated resource.

7. A non-transitory computer-readable medium comprising program code instructions, which when executed by a processor of an electronic device, configure the processor to perform acts comprising:
receiving a request, coming from a program installed on the electronic device, for access to a current resource of preliminarily identified computing resources of which the electronic device has access;
obtaining at least one modulation parameter for access to said current resource within a resource-characterizing data structure, wherein the resource-characterizing data structure associates for each of the preliminarily identified computing resources a respective resource identifier, an indicator and at least one modulation parameter, the indicator indicating whether the associated resource is a resource of a first type of the preliminarily identified computing resources having values that are variable over time or is a resource of a second type of the preliminarily identified computing resources that is distinct from the first type, and wherein
the computing resources of the first type are selected from the group consisting of:
available random-access memory,
available mass storage memory,
power of a received signal,
time,
date,
clock,
electrical consumption,
battery level, and
processor charge level;
the computing resources of the second type are selected from the group consisting of:
an identifier,
a memory address,
a process number, and
a serial number; and
the obtaining comprises:
identifying the current resource in the resource-characterizing data structure as a function of the resource identifier of the current resource; and
obtaining, from said resource-characterizing data structure, the indicator and the at least one modulation parameter associated with the resource identifier of the current resource; and
modulating access to said current resource by the program as a function of the obtained indicator and the obtained at least one modulation parameter associated with said current resource, wherein the modulating comprises:
if the indicator indicates the associated resource is of the first type, sending the program an error-containing piece of information;
else if the indicator indicates the associated resource is of the second type, sending the program a piece of encrypted data or a pointer pointing toward the associated resource.

8. A method for controlling access to preliminarily identified computing resources, the method being implemented by an electronic device configured to modulate access to said computing resources to be controlled, the method comprising:
receiving a request, coming from a program installed on the electronic device, for access to a current resource of the preliminarily identified computing resources;
obtaining at least one modulation parameter for access to said current resource within a resource-characterizing data structure, wherein the resource-characterizing data structure associates for each of the preliminarily identified computing resources a respective resource identifier, an indicator and at least one modulation parameter, the indicator indicating whether the associated resource is a resource of a first type of the preliminarily identified computing resources having values that are variable over time or is a resource of a second type of the preliminarily identified computing resources that is distinct from the first type, wherein the obtaining comprises:
identifying the current resource in the resource-characterizing data structure as a function of the resource identifier of the current resource; and
obtaining, from said resource-characterizing data structure, the indicator and the at least one modulation parameter associated with the resource identifier of the current resource; and
modulating access to said current resource by the program as a function of the obtained indicator and the obtained at least one modulation parameter associated with said current resource, wherein the modulating comprises:
if the indicator indicates the associated resource is of the first type, sending the program an error-containing piece of information;
else if the indicator indicates the associated resource is of the second type, sending the program a piece of encrypted data or a pointer pointing toward the associated resource.

* * * * *